US009077661B2

(12) United States Patent
Andreasen et al.

(10) Patent No.: US 9,077,661 B2
(45) Date of Patent: Jul. 7, 2015

(54) SYSTEM AND METHOD FOR POLICY SELECTION AND SWITCHING FUNCTION IN A NETWORK ENVIRONMENT

(75) Inventors: Flemming S. Andreasen, Marlboro, NJ (US); Kevin D. Shatzkamer, Hingham, MA (US); Kirk McBean, North Wales, PA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 137 days.

(21) Appl. No.: 13/336,949

(22) Filed: Dec. 23, 2011

(65) Prior Publication Data

US 2013/0166746 A1    Jun. 27, 2013

(51) Int. Cl.
*G06F 15/173* (2006.01)
*H04L 12/24* (2006.01)
*H04L 12/14* (2006.01)

(52) U.S. Cl.
CPC ......... *H04L 41/5051* (2013.01); *H04L 12/1407* (2013.01); *H04L 41/0893* (2013.01)

(58) Field of Classification Search
CPC .................................................... G06F 15/173
USPC .................................................. 709/219, 225
See application file for complete search history.

(56) References Cited

U.S. PATENT DOCUMENTS

| 7,062,567 | B2* | 6/2006 | Benitez et al. ................ 709/231 |
| 7,096,212 | B2* | 8/2006 | Tribble et al. .......................... 1/1 |
| 8,180,909 | B2* | 5/2012 | Hartman et al. .............. 709/229 |
| 8,280,354 | B2* | 10/2012 | Smith et al. ................ 455/414.1 |
| 2007/0143851 | A1* | 6/2007 | Nicodemus et al. ............ 726/25 |
| 2008/0196083 | A1* | 8/2008 | Parks et al. ....................... 726/1 |
| 2009/0204612 | A1* | 8/2009 | Keshavarz-Nia et al. ......... 707/6 |
| 2011/0167471 | A1* | 7/2011 | Riley et al. ......................... 726/1 |

FOREIGN PATENT DOCUMENTS

| EP | 2073449 | 6/2009 |
| WO | WO2013/095714 | 6/2013 |

OTHER PUBLICATIONS

3 GPP Organizational Partners, "3rd Generation Partnership Project: Technical Specification Group Services and System Aspects; Policy and Charging Control Architecture (Release 8)," 3 GPP TS 23.203 V8.9.0 (Mar. 2010) © 2010, 116 pages.
3 GPP Organizational Partners, "3rd Generation Partnership Project: Technical Specification Group Services and System Aspects; General Packet Radio Service (GPRS) Enhancements for Evolved Universal Terrestrial Radio Access Network (E-UTRAN) Access (Release 9)," 3 GPP TR 23.401 V9.5.0 (Jun. 2010) © 2010, 259 pages.

(Continued)

*Primary Examiner* — David Lazaro
*Assistant Examiner* — Marie Georges Henry
(74) *Attorney, Agent, or Firm* — Patent Capital Group (57) ABSTRACT

A method is provided in one example embodiment and includes receiving a request for a service for a subscriber at an access gateway; receiving a default subscriber policy and a default service policy at the access gateway; receiving a subscriber policy and a service policy for the service being requested at the access gateway; receiving the service being requested at the access gateway; and communicating the service being requested from the access gateway to the subscriber in response to the request.

20 Claims, 7 Drawing Sheets

(56) References Cited

OTHER PUBLICATIONS

R. Yavatkar, et al., "A Framework for Policy-Based Admission Control," Network Working Group, RFC 2753, 21 pages, Jan. 2000.
PCT Jan. 2, 2013 International Search Report and Written Opinion of the International Searching Authority from Application Serial No. PCT/US2012/048764; 14 pages.
3 GPP Organizational Partners, "3rd Generation Partnership Project; Technical Specification Group Services and System Aspects; Evolution of Policy Control and Charging (Release 7)," 3 GPP TR 23.803 V7.0.0 (Sep. 2005), XP-002408128; © 2005 3GPP Organizational Partners, 30 pages.
PCT Jun. 24, 2014 International Preliminary Report on Patentability from International Application No. PCT/US2012/048674; 8 pages.

* cited by examiner

SYSTEM AND METHOD FOR POLICY SELECTION AND SWITCHING FUNCTION IN A NETWORK ENVIRONMENT

TECHNICAL FIELD

This disclosure relates in general to the field of communications and, more particularly, to a policy selection and switching function in a network environment.

BACKGROUND

End users have more media and communications choices than ever before. A number of prominent technological trends are currently afoot (e.g., more computing devices, more online video services, more Internet video traffic), and these trends are changing the content delivery landscape. Separately, these trends are pushing the limits of capacity and, further, degrading the performance of data delivery systems, where such degradation creates frustration amongst end users, content providers, and service providers. In some instances, subscriber and/or service policy rules that determine how the data will be delivered cannot be obtained efficiently, or the data sought for delivery cannot comply with a set of subscriber and service policy rules. Hence, there is a challenge in providing an appropriate response strategy for these problematic network scenarios.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment A method is provided in one example embodiment and includes receiving a request for a service for a subscriber at an access gateway; receiving a default subscriber policy and a default service policy at the access gateway; receiving a subscriber policy and a service policy for the service being requested at the access gateway; receiving the service being requested at the access gateway; and communicating the service being requested from the access gateway to the subscriber in response to the request.

In more particular embodiment, the method may include identifying information within a bearer service request associated with a particular subscriber; and determining a specific service policy and charging rules function (PCRF) server to be used for a particular transaction involving the particular subscriber. The information within the bearer service request may include a destination address, a 5-tuple, or a uniform resource locator (URL) provided in a hypertext transfer protocol (HTTP) header. Additionally, the access gateway may include a local PCRF functionality to be provided to a particular subscriber.

In specific implementations, the access gateway is configured to evaluate behavior associated with the subscriber in order to respond to subscriber policy requests for particular network services. In addition, the access gateway is configured to determine a subset of subscribers accessing similar services, and to group the subset of subscribers into a subscriber group for which a specific group policy is applied to. The subscriber group can be formed based on usage trends and current services associated with the subset of subscribers. In addition, the method may include receiving a second subscriber policy and a second service policy for the requested service if the subscriber policy and the service policy for the service being requested do not conform to the default subscriber policy and the default service policy.

Example Embodiments

Figure 1A:
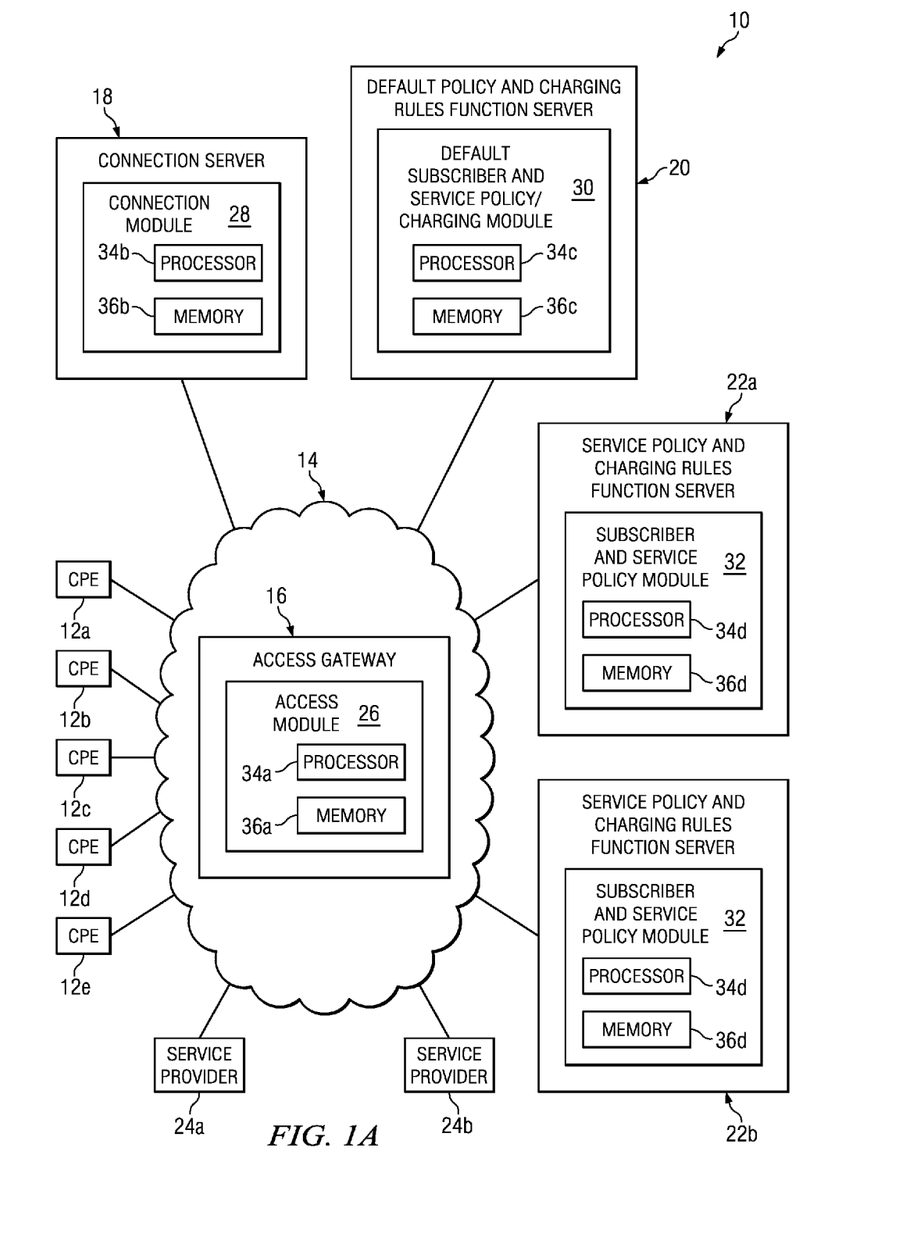
FIG. 1A is a simplified block diagram of a communication system for a policy selection and switching function in accordance with one embodiment of the present disclosure.

Turning to FIG. 1A, FIG. 1A is a simplified block diagram of a communication system 10 for a policy selection and switching function in accordance with one embodiment of the present disclosure. Communication system 10 includes multiple instances of customer premise equipment (CPEs) 12a-e, a network 14, an access gateway 16, a connection server 18, a default policy and charging rules function (D-PCRF) server 20, service policy and charging rules function (S-PCRF) servers 22a and 22b, and service providers 24a and 24b. Access gateway 16 may include an access module 26 in a particular embodiment. Access module 26 may include a processor 34a and a memory 36a. Connection server 18 may include a connection module 28, which may include a processor 34b and a memory 36b. D-PCRF server 20 may include a default subscriber and service policy/charging module 30. Default subscriber and service policy/charging module 30 may include a processor 34c and a memory 36c. S-PCRF 22a and 22b each contain a subscriber and service policy module 32. Subscriber and service policy module 32 may include a processor 34d and a memory 36d.

In one particular instance, communication system 10 may be configured for service-specific policy and charging rules function (PCRF)-selection/delegation and communication based on information derived from a bearer plane of access gateway 16. A hierarchical or segmented policy server deployment (as a means of policy server offload and reduced system latency may also be implemented). In addition, a subscriber group policy may be implemented, as a means of aggregating multiple subscriber requests for the same service. Such implementations may offer an improvement over an application-specific policy server deployment, or subscriber/APN-specific policy server deployments.

In one particular instance, communication system 10 may be configured to allow a gateway to interact with multiple PCRFs per Access Point Name (APN) (e.g., APN+user equipment (UE)+Flow)) instead of a gateway that can only interact with a single PCRF per APN (e.g., APN+UE). For example, a mobile operator may not need to own policy rules for every service, especially those that are provided by entities who have business relationships that allow preferential treatment over communication system 10, and where a load can be distributed off a single PCRF point of failure. Further, the deployment of best-of-breed policy/analytics engines may be done without large integration efforts.

In another particular instance, communication system 10 may be configured such that local and remote policies can be defined and queried in serial, and a gateway provides the correlation and discrepancy resolution to correlate/resolve any discrepancies between the policies. Such a configuration could allow for more robust policy definition models. In addition, disparate policy systems may be integrated with an automatic dispute resolution process. In an embodiment, access gateway 16 may be configured as an IP session anchor and a policy session anchor where an IP session anchor and a policy session anchor may be converged.

In another particular instance, communication system 10 may be configured to allow PCRF chaining to be done on a Gx path (i.e., path between a gateway and a PCRF in a long term evolution (LTE) architecture) instead of chaining of PCRFs using an Rx path (i.e., path between an interface northbound of a PCRF in an LTE architecture). Such a configuration can allow a gateway to own correlation of policies, both local and remote. In addition, the gateway may be configured to request multiple policies in parallel, rather than rely on a serial policy chain.

For purposes of illustrating certain example techniques of communication system 10, it is important to understand the communications that may be traversing the network. The following foundational information may be viewed as a basis from which the present disclosure may be properly explained. 3rd Generation Partnership Project (3GPP) and mobile standards organizations define interaction with a PCRF for establishment policy (e.g. quality of service (QoS)) and charging rules on a per-subscriber and a per-application basis. A single policy system maintaining all policy and charging rules for every application and every subscriber may not be a pragmatic approach, as transaction rates to the PCRF grow significantly with mobility events, application events, and policy decision requests. Furthermore, some of the policy decision requests are related to interactive or real-time services, where the added delay incurred by communication and processing with a separate PCRF may lead to a suboptimal end-user experience. Conversely, complex and comprehensive policies for some services may be best provided by a separate PCRF.

In accordance with one example implementation, as more and more applications are vertically integrated with intelligent policy engines, communication system 10 may be configured to allow an edge gateway (e.g. packet data network gateway (PGW), broadband data network gateway (BNG), etc.) to select a unique policy server based on bearer flow information (such as 5-tuple or DPI), rather than strictly on a pre-configured static server (or agent) address or APN. Additionally, communication system 10 may be configured for a PCRF to delegate further PCRF operations for a bearer flow to a different PCRF (e.g. to a PCRF available locally on an edge gateway).

In one embodiment, for a particular subscriber, service, or session, communication system 10 can allow a single gateway to communicate with multiple PCRFs. For example, a subscriber attaches to the network and the edge gateway to retrieve PCRF information. A PCRF is denoted as the default PCRF, or D-PCRF (e.g., D-PCRF 20) and the subscriber session is anchored at the D-PCRF for retrieval of all subscriber-specific policies. Part of the policy profile defines the set of services that can be handled by S-PCRFs (e.g., S-PCRF 22a and 22b), which may or may not be co-located with a D-PCEF.

In accordance with one example implementation, a subscriber accesses a service, either operator-owned or partnered, in which a specific policy must be applied (i.e., the service has an integrated PCRF function). The gateway is configured to understand, based on information contained in the bearer service request (e.g., destination address, 5-tuple, URL in HTTP header, DPI, etc.) that a specific S-PCRF is to be used for a specific transaction. In this embodiment, the gateway may also inform the D-PCRF of a service-specific policy either at session establishment, or at termination. This embodiment enables application-specific policies and macro policies to interwork through the edge gateway.

In another embodiment, the gateway may have embedded or local PCRF functionality available. The gateway may determine, based on subscriber behavior and bearer flows, that a local PCRF, specified with a subset of functionality of the S-PCRF, may adequately respond to subscriber policy requests for certain services. This embodiment allows gateway adjacent or co-located PCRFs to be deployed as a policy offload function for network-wide S-PCRFs, or hierarchical policy.

In yet other implementations, the gateway determines that a subset of subscribers is accessing similar services, which may or may not be predefined. The gateway may be configured to correlate the subset of subscribers into a subscriber group. The subscriber group may be grouped by location, service requested, application-specific, D-PCRF specific, etc. Hence, one request to a PCRF could set the policy for the entire group such that the policy does not have to be requested for each member of the group. Alternatively, communications flow may be used to set policy for each subscriber of the group, rather than an individual communications flow per subscriber. Subscriber group policy allows the dynamic classification and systematic clustering of subscribers with similar attributes (e.g., usage trends, current services, preferences, profile, etc.) to be clustered and treated in a common manner. While some level of subscriber group policy can be achieved statically, the system allows for dynamic group policy creation based on individual member interactions with the network, with services, or with each other.

In terms of the infrastructure of the present disclosure, CPEs 12a-e can be associated with clients, customers, endpoints, handheld devices, or end users wishing to initiate a communication in communication system 10 via some network. The term 'subscriber' is inclusive of these elements, as well as devices used to initiate a communication, such as a receiver, a computer, a set-top box, an Internet radio device (IRD), a cell phone, a smart phone, a tablet, a personal digital assistant (PDA), an iPad, an iPhone, a Google Droid, or any other device, component, element, or object capable of initiating voice, audio, video, media, or data exchanges within communication system 10. CPEs 12a-e may also be inclusive of a suitable interface to the human user, such as a display, a keyboard, a touchpad, a remote control, or other terminal equipment. CPEs 12a-e may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Connection server 18 may be an authentication, authorization, and accounting (AAA) server or home subscriber service (HSS) server. For an AAA server, authentication refers to the process where a user's or CPE's identity is authenticated, typically by providing evidence that it holds a specific digital identity such as an identifier and the corresponding credentials. The authorization function determines whether a particular user or CPE is authorized to perform a given activity, typically inherited from authentication when logging on to an application or service. Accounting refers to the tracking of network resource consumption by users or CPEs for the purpose of capacity and trend analysis, cost allocation, billing, etc. A HSS server typically contains subscription-related information (subscriber profiles for users or CPEs 12a-e), performs authentication and authorization of the users or CPEs, and can provide information about the subscriber's location and IP information.

D-PCRF server 20 may be an operator-owned entity residing under operational control of the same entity that owns network 14. D-PCRF server 20 may be configured to determine policy rules in a multimedia network. For example, D-PCRF server 20 may be configured to determine policy rules for a specific subscriber such as how to treat a subscriber (e.g., CPEs 12a-e) for aggregate services, how to prioritize service lists, generic charging/QoS for undefined services, etc. D-PCRF server 20 may also be configured to provide a service definition (e.g., 5-tuple, Appl-layer, etc.), the location of service specific S-PCRF servers 22a and 22b, etc. D-PCRF server 20 may accesses subscriber databases and other specialized functions, such as charging systems, in a scalable and centralized manner.

S-PCRF may or may not be an operator-owned entity (meaning there is no requirement that network 14 and S-PCRF servers 22a and 22b are within the same operational domain). S-PCRF servers 22a and 22b may be configured to determine policy rules that are specific to the service being provided (policy rules different than D-PCRFS server 20) in a multimedia network. For example, S-PCRF servers 22a and 22b may be configured to determine charging/QoS rules for a specific service. In addition, S-PCRF servers 22a and 22b may also be configured to determine how to treat the specific service for aggregate subscribers and contain a subscriber prioritization list for the specific service.

D-PCRF server 20 and S-PCRF servers 22a and 22b can be part of a network architecture that aggregates information to and from network 14, operational support systems, and other sources (such as portals) in real time and supports the creation of rules and then makes policy decisions for each user or CPEs 12a-e active on the network. Such a network can offer multiple services, policies such as quality of service (QoS) levels, and charging rules.

Network 14 (and others discussed herein) represents a series of points or nodes of interconnected communication paths for receiving and transmitting packets of information that propagate through the architecture. Network 14 offers a communicative interface between sources and/or hosts, and each may be any local area network (LAN), wireless local area network (WLAN), metropolitan area network (MAN), Intranet, Extranet, WAN, virtual private network (VPN), or any other appropriate architecture or system that facilitates communications in a network environment. The architecture of the present disclosure may include a configuration capable of transmission control protocol/internet protocol (TCP/IP) communications for the transmission and/or reception of packets in a network. The architecture of the present disclosure may also operate in conjunction with a user datagram protocol/IP (UDP/IP) or any other suitable protocol, where appropriate and based on particular needs.

Network 14 may implement a UDP/IP connection and use a TCP/IP communication language protocol in particular embodiments of the present disclosure. Further, network 14 may implement any other suitable communication protocol for transmitting and receiving data packets within the architecture. Data, as used herein in this document, refers to any type of numeric, voice, video, media, or script data, or any type of source or object code, or any other suitable information in any appropriate format that may be communicated from one point to another.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures. The architecture of the present disclosure may include a configuration capable of transmission control protocol/internet protocol (TCP/IP) communications for the transmission and/or reception of packets in a network. The architecture of the present disclosure may also operate in conjunction with a user datagram protocol/IP (UDP/IP) or any other suitable protocol, where appropriate and based on particular needs.

Access gateway 16, connection server 18, D-PCRF server 20 and S-PCRF servers 22a and 22b are network elements that can facilitate the access activities discussed herein. As used herein in this Specification, the term 'network element' is meant to encompass any of the aforementioned elements, as well as routers, switches, cable boxes, gateways, bridges, load balancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, access gateway 16, connection server 18, D-PCRF server 20 and/or S-PCRF servers 22a and 22b include software to achieve (or to foster) the policy and switching activities discussed herein. This could include the implementation of instances of access module 26, connection module 28, default subscriber and service policy/charging module 30, and subscriber and service policy module 32. Additionally, each of these elements can have an internal structure (e.g., a processor, a memory element, etc.) to facilitate some of the operations described herein. In other embodiments, these policy and switching activities may be executed externally to these elements, or included in some other network element to achieve the intended functionality. Alternatively, access gateway 16, connection server 18, D-PCRF server 20 and S-PCRF servers 22a and 22b may include software (or reciprocating software) that can coordinate with other network elements in order to achieve the policy and switching activities described herein. In still other embodiments, one or several devices may include any suitable algorithms, hardware, software, components, modules, interfaces, or objects that facilitate the operations thereof.

Figure 1B:
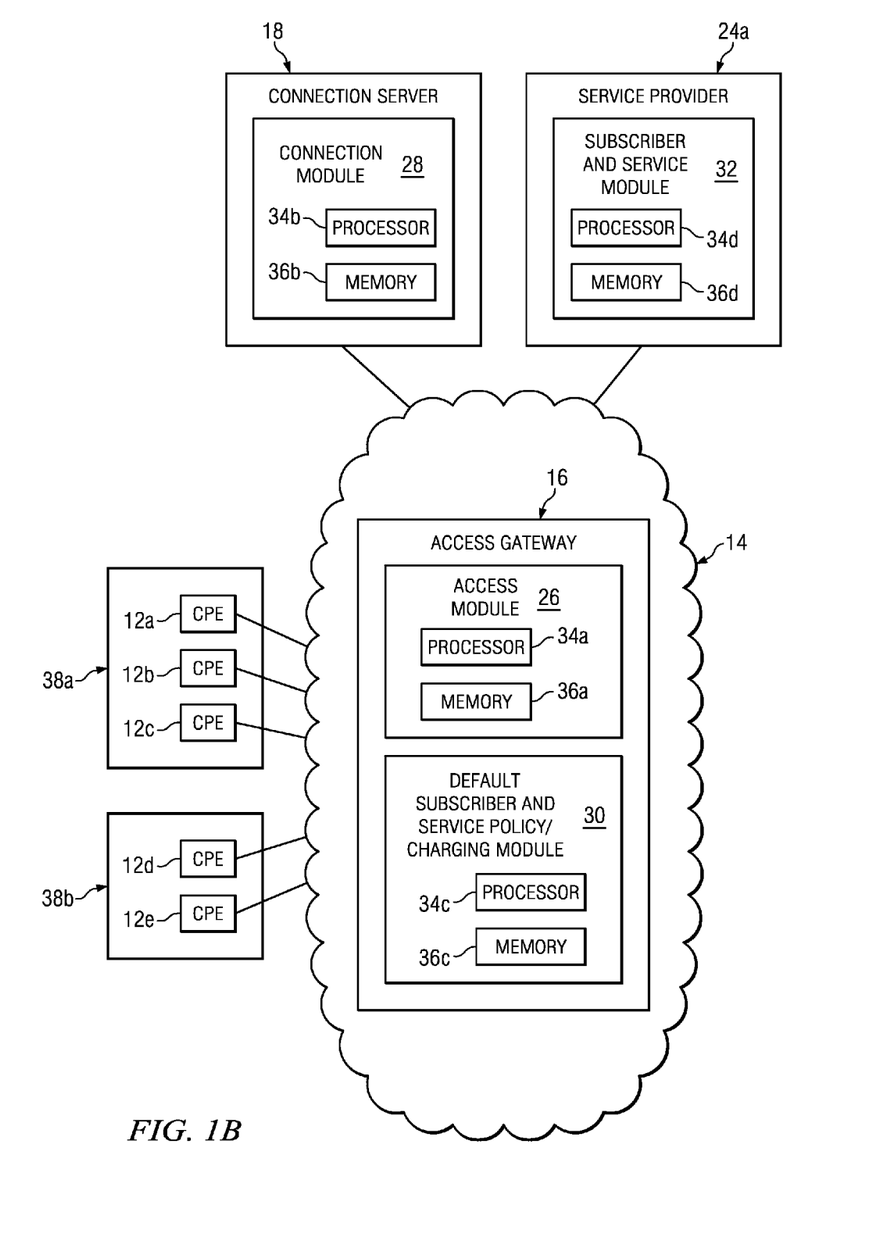
FIG. 1B is a simplified block diagram illustrating possible example details associated with the communication system.

Turning to FIG. 1B, FIG. 1B is a simplified block diagram illustrating one possible set of details associated with communication system 10. This particular configuration includes CPEs 12a-e, network 14, access gateway 16, connection server 18, and service provider 24a. CPEs 12a-c are grouped into a first group 38a. CPEs 21d and 12e are grouped into a second group 38b. Access gateway 16 may include access module 26 and default subscriber and service policy/charging module 30. Access module 26 may include processor 34a and memory 36a. Default subscriber and service policy/charging module 30 may include processor 34c and memory 36c. Connection server 18 may include connection module 28. Connection module 28 may include processor 34b and memory 36b. Service provider 24a may include subscriber and service module 32. Subscriber and service module 32 may include processor 34d and memory 36d.

First group 38a has at least one common characteristic such as location, service requested, application-specific, D-PCRF specific, etc. One request from any CPE in first group 38a to a PCRF (e.g., D-PCRF 20 or S-PCRF 22a) could set the policy for the entire group such that the policy does not have to be requested for each member of the group. Alternatively, communications flow can be used to set policy for each subscriber of the group, rather than an individual communications flow per subscriber.

Similarly, second group 38b has at least one common characteristic such as location, service requested, application-specific, D-PCRF specific, etc. Note that at least one common characteristic for second group 38b may or may not be different than the at least one common characteristic for first group 38a. One request from any CPE in second group 38b to a PCRF (e.g., D-PCRF 20 or S-PCRF 22a) could set the policy for the entire group such that the policy does not have to be requested for each member of the group. Alternatively, communications flow can be used to set policy for each subscriber of the group, rather than an individual communications flow per subscriber.

First group 38a has at least one common characteristic such as location, service requested, application-specific, D-PCRF specific, etc. One request from any CPE in first group 38a to a PCRF (e.g., D-PCRF 20 or S-PCRF 22a) could set the policy for the entire group such that the policy does not have to be requested for each member of the group. Alternatively, a communications flow may be used to set policy for each subscriber of the group, rather than an individual communications flow per subscriber.

Similarly, second group 38b has at least one common characteristic such as location, service requested, application-specific, D-PCRF specific, etc. Note that the at least one common characteristic for second group 38b may or may not be different than the at least one common characteristic for first group 38a. One request from any CPE in second group 38b to a PCRF (e.g., D-PCRF 20 or S-PCRF 22a) could set the policy for the entire group such that the policy does not have to be requested for each member of the group. Alternatively, a communications flow may be used to set policy for each subscriber of the group, rather than an individual communications flow per subscriber.

In operational terms, CPE 12a sends a request for a service to access gateway 16. Access gateway 16 uses access module 26 to access connection server 18 for authentication on the network. Once authenticated, default subscriber and service policy/charging module 30 is accessed to obtain default subscriber and service policies (default subscriber and service policy/charging module 30 can be located in access gateway 16 or D-PCRF 20, as shown in FIG. 1). Subscriber and service policy module 32 is accessed to determine service specific subscriber and service polices (subscriber and service policy module 32 can be located in service provider 24a or 24b or S-PCRF 22a and 22b as shown in FIG. 1). Access module 26 or default subscriber and service policy/charging module 30 may also determine the location of subscriber and service module 32.

In one example, after CPE 12a has been authenticated by connection server 18, access gateway 16 may obtain the maximum allowable download speed for CPE 12a and the maximum amount of data that CPE 12a can download from default subscriber and service policy/charging module 30. Then, subscriber and service policy module 32 is located and access gateway 16 may obtain the allowable download speed for the service and the amount of data that will be downloaded for the service from subscriber and service policy module 32. Access gateway 16 can then obtain the service from a provider of the service (e.g., service provider 24a) and sent the requested service to CPE 12a using the default subscriber and service policies from default subscriber and service policy/charging module 30 and the service specific subscriber and service polices from subscriber and service policy module 32.

Figure 1C:
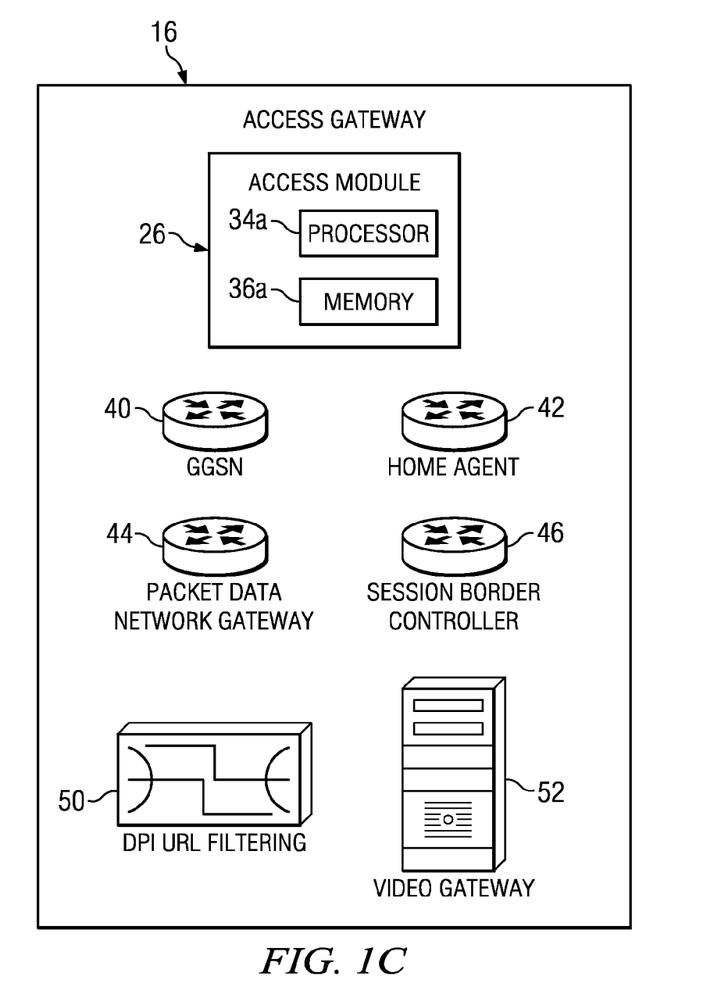
FIG. 1C is a simplified block diagram illustrating potential operations associated with the communication system.

Turning to FIG. 1C, FIG. 1C is a simplified block diagram illustrating one possible set of details associated with access gateway 16. Access gateway may include access module 26. Access module 26 may include processor 34a and memory 36a. In an embodiment, access gateway 16 may also include a gateway general packet radio service support node (GGSN) 40, a home agent 42, a packet data network gateway (PGW) 44, a session border controller (SBC) 46, a deep packet inspection (DPI) URL filtering monitor 50, a video gateway 52, or any combination thereof.

GGSN 40 may be a component of a GPRS network. GGSN 40 may be responsible for the interworking between the GPRS network and external packet switched networks, (e.g., the Internet and X.25 networks). From an external network's point of view, GGSN 40 can be a router to a sub-network, because GGSN 40 can 'hide' the GPRS infrastructure from the external network. In one example, GGSN 40 is an anchor point that enables the mobility of a user terminal in GPRS/UMTS networks. In essence, GGSN 40 carries out the role in GPRS equivalent to the home agent in mobile IP. GGSN 40 can maintain routing necessary to tunnel the Protocol Data Units (PDUs) to the SGSN that services a particular mobile station.

Home agent 42 may be a router on a mobile node's home network which tunnels datagrams for delivery to the mobile node (e.g., a mobile CPE 12a) when the mobile node is away from home. Home agent 42 can be configured to maintain current location (IP address) information for the mobile node. Home agent 42 may be used in a Mobile IP (or IP mobility) protocol. Mobile IP is an Internet Engineering Task Force (IETF) standard communications protocol that is designed to allow mobile device users to move from one network to another while maintaining a permanent IP address. (Mobile IP for IPv4 is described in IETF RFC 5944, and extensions are defined in IETF RFC 4721 and Mobile IPv6 is described in RFC 6275.)

PGW 44 can act as the interface between a LTE network and other packet data networks, such as the Internet, or SIP-based IMS networks. PGW 44 may serve as an anchor point for network mobility and act as a policy and charging enforcement function (PCEF), manage QoS, and/or provide DPI and lawful intercept of data packets. PGW 44 may consist of S5/S8 control and data plane stacks to support S5/S8 interface with a serving gateway. PGW 44 can support a S5/S8 interface with the serving gateway. An integrated control plane stack for the S5/S8 interfaces can consist of IP, UDP, eGTP-C, etc. The integrated data plane stack for the S5/S8 interface can consist of IP, UDP, eGTP-U, etc.

SBC 46 may be a device deployed in Voice over Internet Protocol (VoIP) networks to exert control over the signaling and also the media streams involved in setting up, conducting, and tearing down telephone calls or other interactive media communications. SBC 46 can be configured to be on the borders between two service provider networks in a peering environment or to include significant deployments between a service provider's access network and a backbone network to provide service to residential and/or enterprise customers. SBC 46 can be inserted into signaling and/or media paths between calling and called parties in a VoIP call, predominantly those using a Session Initiation Protocol (SIP), H.323, and MGCP call signaling protocols.

Figure 2:
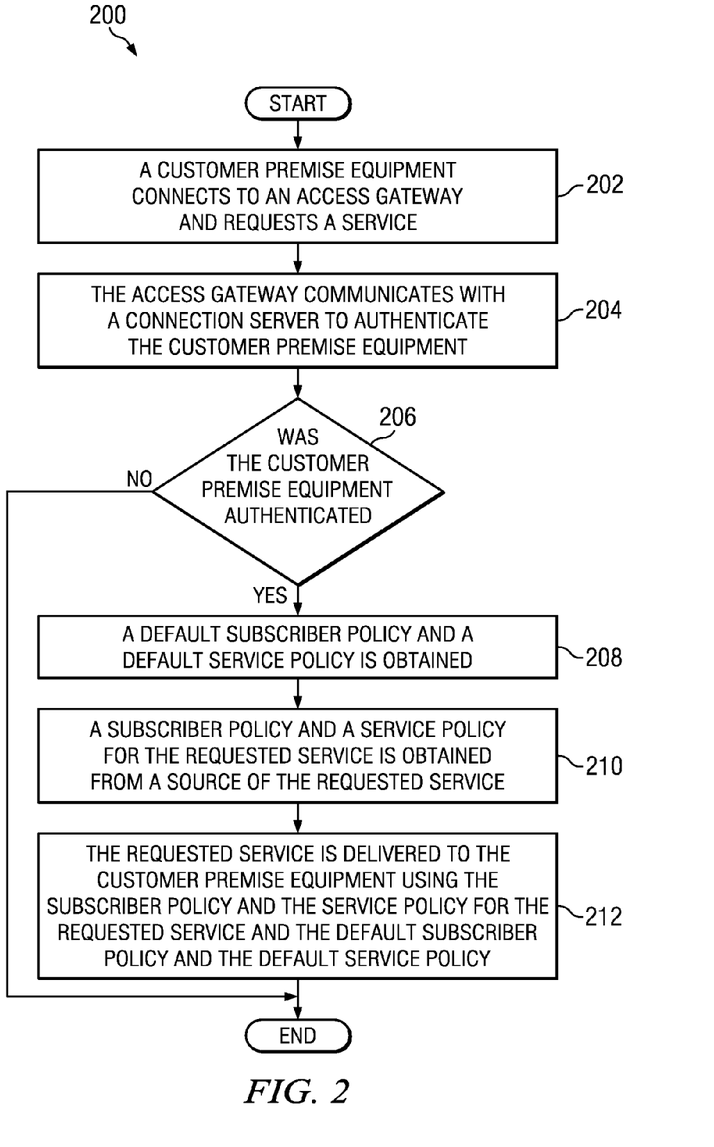
FIG. 2 is a simplified flowchart illustrating potential operations associated with the communication system.

Turning to FIG. 2, FIG. 2 is a simplified flowchart 200 illustrating example activities for a policy selection and switching function in accordance with one embodiment of the present disclosure. At 202, a CPE connects to access gateway and requests a service. For example, CPE 12a connects to access gateway 16. At 204, the access gateway communicates with a connection server to authenticate the CPE. For example, access gateway 16 may connect to connection server 18 to authenticate CPE 12a. At 206, the system determines if the CPE was authenticated. If the CPE was not authenticated, then the process can stop. If the CPE was authenticated, then a default subscriber policy and a default service policy are obtained, as in 208. For example, the default subscriber policy and default service policy may be obtained from D-PCRF server 20. At 210, a subscriber policy and a service policy for the requested service are obtained from a source for the requested service. For example, a subscriber policy and a service policy for the requested service may be obtained from S-PCRF server 22a. At 212, the requested service is delivered to the CPE using the subscriber policy and the service policy for the requested service in the default subscriber policy and the default service policy. For example, the requested service may be obtained from service provider 24a and delivered to CPE 12a using the subscriber policy in the service policy for the requested service obtained from S-PCRF server 22a and the default subscriber policy in the default service policy obtained from D-PCRF server 20.

Figure 3:
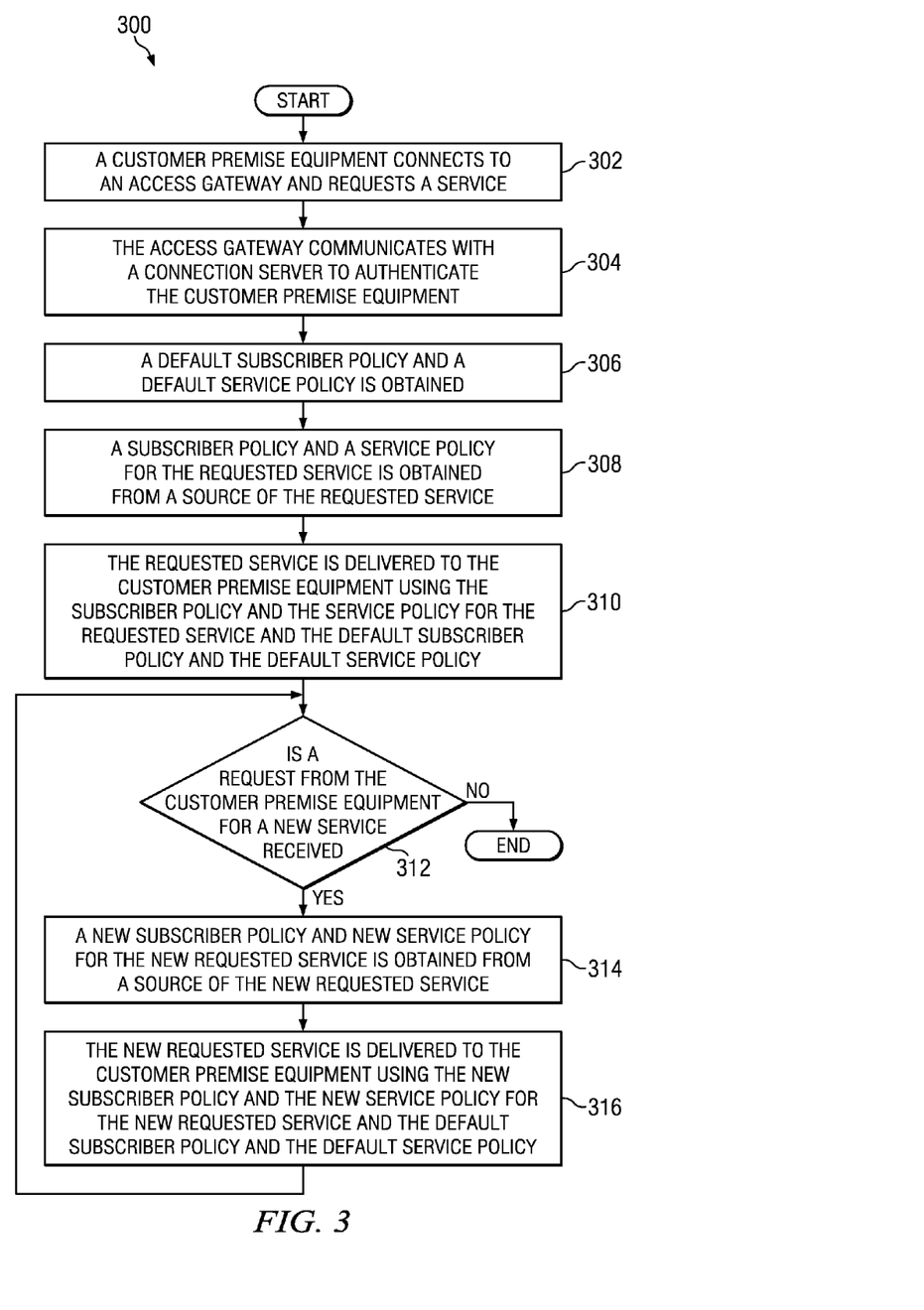
FIG. 3 is another simplified flowchart illustrating potential operations associated with the communication system.

Turning to FIG. 3, FIG. 3 is a simplified flowchart 300 illustrating example activities for a policy selection and switching function in accordance with one embodiment of the present disclosure. At 302, a CPE connects to an access gateway and requests a service. For example, CPE 12a connects to access gateway 16. At 304, the access gateway communicates with a connection server to authenticate the CPE. For example, access gateway 16 may connect to connection module 28 located in connection server 18 to authenticate CPE 12a. At 306, a default subscriber policy and a default service policy are obtained. For example, the default subscriber policy and default service policy may be obtained from default subscriber and service policy/charging module 30. At 308, a subscriber policy and a service policy for the requested service are obtained from a source of the requested service. For example, a subscriber policy and a service policy for the requested service may be obtained from subscriber and service policy module 32 located in service provider 24a.

At 310, the requested service is delivered to the CPE using the subscriber policy and the service policy for the requested service, and the default subscriber policy and the default service policy. For example, the requested service may be obtained from service provider 24a and delivered to CPE 12a using the subscriber policy in the service policy for the requested service obtained from subscriber and service policy module 32 and the default subscriber policy in the default service policy obtained from default subscriber and service policy/charging module 30.

At 312, the system determines if a request is received from the CPE for a new service. If the system determines that the received request is not from the CPE for a new service, then the process ends. If the system determines that the received request is from the CPE for a new service, then a new subscriber policy and a new service policy for the new requested service is obtained from a source of the new requested service, as in 314. For example, a subscriber policy and a service policy for the requested service may be obtained from S-PCRF server 22b. At 316, the new requested service is obtained and delivered to the CPE using the new subscriber policy and the new service policy for the new requested service in the default subscriber policy and the default service policy. For example, the requested new service may be obtained from service provider 24b and delivered to CPE 12a using the subscriber policy in the service policy for the requested service obtained from S-PCRF server 22b and the default subscriber policy in the default service policy obtained from D-PCRF server 20. At 312, the system determines if a request is received from the CPE for a new service.

Figure 4:
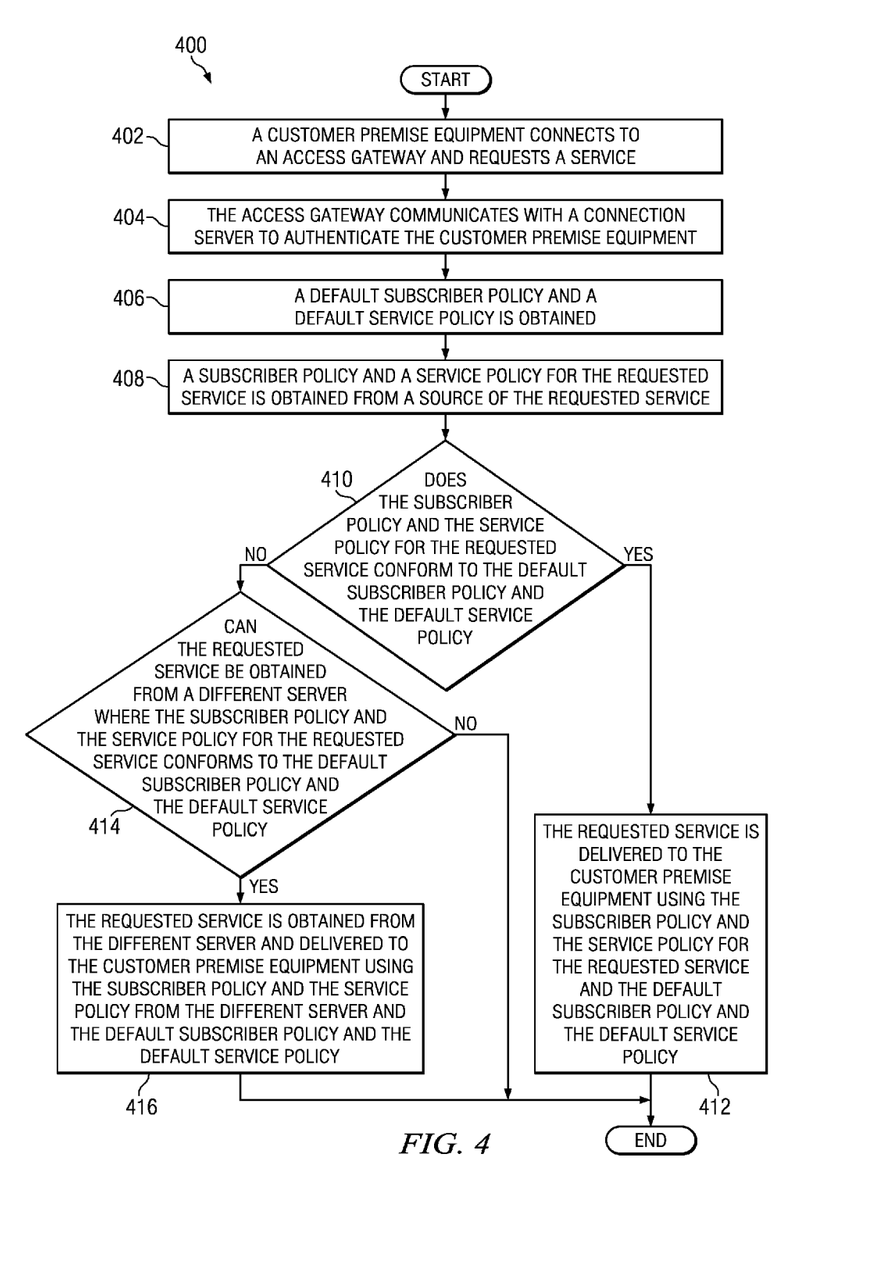
FIG. 4 is another simplified flowchart illustrating potential operations associated with the communication system.

Turning to FIG. 4, FIG. 4 is a simplified flowchart 400 illustrating example activities for a policy selection and switching function in accordance with one embodiment of the present disclosure. At 402, a CPE connects to an access gateway and requests a service. For example, CPE 12a connects to access gateway 16. At 404, the access gateway communicates with a connection server to authenticate the CPE. For example, access gateway 16 may connect to connection server 18 to authenticate CPE 12a. At 406, a default subscriber policy and a default service policy are obtained. For example, the default subscriber policy and default service policy may be obtained from D-PCRF server 20. At 408, a subscriber policy and a service policy for the requested service are obtained from a source for the requested service. For example, a subscriber policy and a service policy for the requested service may be obtained from S-PCRF server 22a, where S-PCRF server 22a has obtained the subscriber policy and service policy from service provider 24a.

At 410, the system determines if the subscriber policy and the service policy for the requested service conform to the default subscriber policy in the default service policy. If the system determines that the subscriber policy and the service policy for the requested service information conform to the default subscriber policy and the default service policy, then the requested service is delivered to the CPE using the subscriber policy and the service policy for the requested service in the default subscriber policy and the default service policy, as in 412. If the system determines that the subscriber policy and the service policy for the requested service information do not conform to the default subscriber policy and the default service policy, then the system determines if the requested service can be obtained from a different server where the subscriber policy and the service policy for the requested service conforms to the default subscriber policy and the default service policy, as in 414. For example, a different subscriber policy and a service policy for the requested service may be obtained from S-PCRF server 22b, where S-PCRF server 22b has obtained the different subscriber policy and service policy from service provider 24b.

If the system determines that the subscriber policy and the service policy for the requested service cannot be obtained from a different server where the subscriber policy and the service policy for the requested service conforms to the default subscriber policy and the default service policy, then the process ends. If the system determines that the subscriber policy and the service policy for the requested service can be obtained from a different server where the subscriber policy and the service policy for the requested service conforms to the default subscriber policy and the default service policy, then the requested service is obtained from a different server and delivered to the CPE using the subscriber policy and the service policy from the different server and the default subscriber policy and the default service policy, as in 416.

Figure 5:
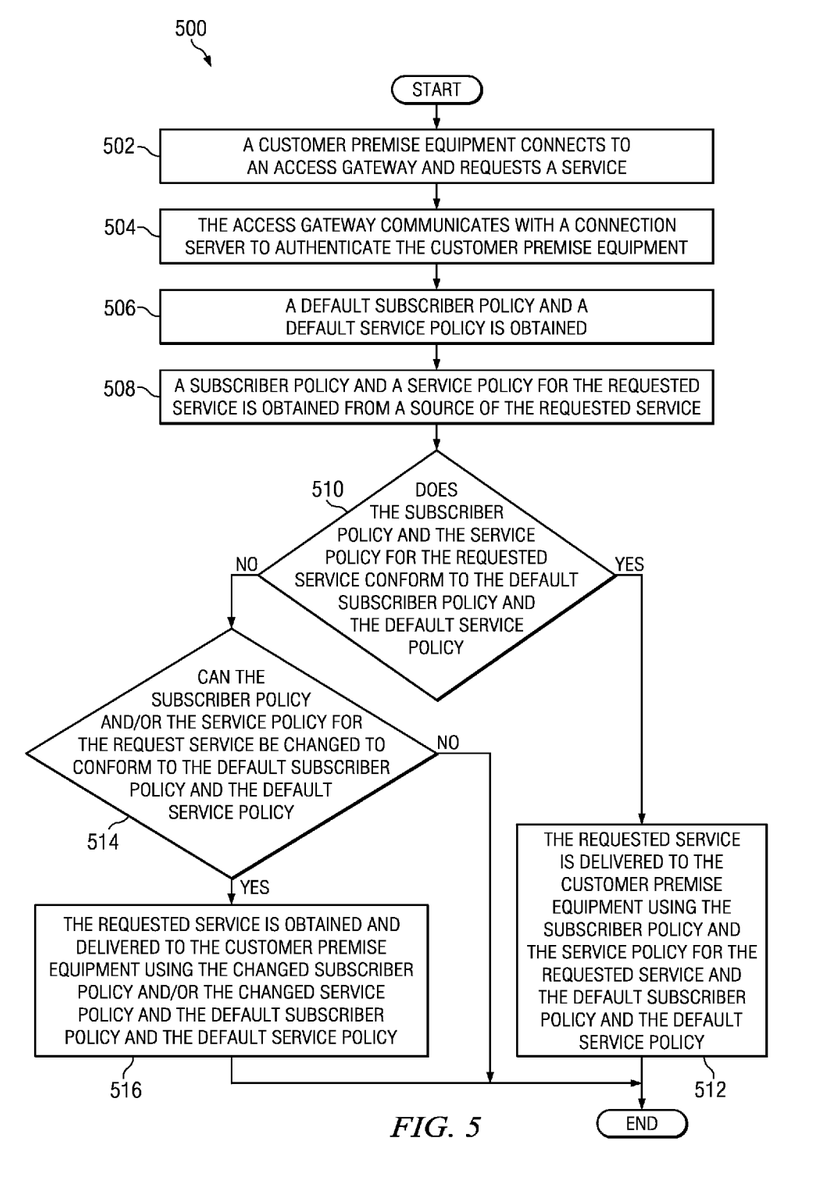
FIG. 5 is another simplified flowchart illustrating potential operations associated with the communication system.

Turning to FIG. 5, FIG. 5 is a simplified flowchart 500 illustrating example activities for a policy selection and switching function in accordance with one embodiment of the present disclosure. At 502, a CPE connects to an access gateway and requests a service. For example, CPE 12*a* connects to access gateway 16. At 504, the access gateway communicates with a connection server to authenticate the CPE. For example, access gateway 16 may connect to connection server 18 to authenticate CPE 12*a*. At 506, a default subscriber policy and a default service policy are obtained. For example, the default subscriber policy and default service policy may be obtained from default subscriber and service policy/charging module 30. At 508, a subscriber policy and a service policy for the requested service are obtained from a source for the requested service. For example, a subscriber policy and a service policy for the requested service may be obtained from subscriber and service policy module 32 located in service provider 24*a*.

At 510, the system determines if the subscriber policy and the service policy for the requested service conform to the default subscriber policy in the default service policy. If the system determines that the subscriber policy and the service policy for the requested service information conform to the default subscriber policy and the default service policy, then the requested service is delivered to the CPE using the subscriber policy and the service policy for the requested service in the default subscriber policy and the default service policy, as in 512. If the system determines that the subscriber policy and the service policy for the requested service information do not conform to the default subscriber policy and the default service policy, then the system determines if the subscriber policy and/or the service policy for the requested service can be changed to conform to the default subscriber policy and the default service policy, as in 514.

If the system determines that the subscriber policy and the service policy for the requested service cannot be changed to conform to the default subscriber policy and the default service policy, then the process ends. If the system determines that the subscriber policy and the service policy for the requested service can be changed to conform to the default subscriber policy and the default service policy, then the requested service is obtained and delivered to the CPE using the changed subscriber policy and/or the changed service policy the default subscriber policy and the default service policy, as in 516.

In one embodiment, the system determines if any subscriber policies and/or service policies for a previously requested service that is still being delivered to the CPE can be changed to allow the subscriber policy and/or the service policy for the requested service to conform to the default subscriber policy and the default service policy. For example, a first requested service may be delivered using a specific download speed that conforms to the default subscriber policy and the default service policy and the subscriber policy and the service policy for the first requested service. If a subscriber policy and a service policy for a second requested service does not conform to the default subscriber policy and the default service policy, then if possible, the subscriber policy and the service policy for the first requested service may be changed or the download speed for the first requested service may be changed to allow the subscriber policy and/or the service policy for the requested service to conform to the default subscriber policy and the default service policy.

As identified previously, a network element (e.g., an access gateway) can include software to achieve the policy management operations, as outlined herein in this document. In certain example implementations, the policy and switching management functions outlined herein may be implemented by non-transitory logic encoded in one or more tangible media (e.g., embedded logic provided in an application specific integrated circuit [ASIC], digital signal processor [DSP] instructions, software [potentially inclusive of object code and source code] to be executed by a processor [processors 34*a-d* shown in FIGS. 1A and 1B], or other similar machine, etc.). In some of these instances, a memory element [memory 36*a-d* shown in FIGS. 1A and 1B] can store data used for the operations described herein. This includes the memory element being able to store logic (e.g., software, code, processor instructions) that is executed to carry out the activities described in this Specification. The processor (e.g., processor 34*a-d*) can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the policy and switching activities as outlined herein. Additionally, each of these devices may include a processor that can execute software or an algorithm to perform the access management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and, further, can accommodate a large number of components, as well as more complicated/sophisticated arrangements and configurations. Accordingly, the examples provided should not limit the scope or inhibit the broad teachings of communication system 10, as potentially applied to a myriad of other architectures.

It is also important to note that the steps in the preceding FIGURES illustrate only some of the possible scenarios that may be executed by, or within, communication system 10.

Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    receiving a request for a service for a subscriber at an access gateway;
    receiving, at the access gateway, from a first source, a default subscriber policy and a default service policy for the subscriber;
    receiving, at the access gateway, from a second source, a specific subscriber policy and a specific service policy for the subscriber and the service being requested, wherein the first source is physically separate from the second source, and wherein the specific subscriber policy and the specific service policy are different than the default subscriber policy and the default service policy;
    identifying information within a bearer service request associated with a particular subscriber;
    determining a specific service policy and charging rules function (PCRF) server to be used for a particular transaction involving the particular subscriber;
    providing correlation and discrepancy resolution between the default subscriber policy and the specific subscriber policy and the default service policy and the specific service policy for the service;
    receiving the service being requested at the access gateway; and
    communicating the service being requested from the access gateway to the subscriber in response to the request.

2. The method of claim 1, wherein the information within the bearer service request includes a selected one of a group of pieces of information, the group consisting of:
    a) a destination address;
    b) a 5-tuple; and
    c) a uniform resource locator (URL) provided in a hypertext transfer protocol (HTTP) header.

3. The method of claim 1, wherein the access gateway includes a local PCRF functionality to be provided to a particular subscriber.

4. The method of claim 1, wherein the access gateway is configured to evaluate behavior associated with the subscriber in order to respond to subscriber policy requests for particular network services associated with the subscriber.

5. The method of claim 1, wherein the access gateway is configured to determine a subset of subscribers accessing similar services, and to group the subset of subscribers into a subscriber group for which a specific group policy is applied to.

6. The method of claim 5, wherein the subscriber group is formed based on usage trends and current services associated with the subset of subscribers.

7. The method of claim 1, further comprising:
    receiving a second subscriber policy and a second service policy for the requested service if the specific subscriber policy and the specific service policy for the service being requested do not conform to the default subscriber policy and the default service policy.

8. The method of claim 1, wherein policies for the service are defined in serial.

9. Logic encoded in non-transitory media that includes instructions for execution and when executed by a processor operable to perform operations, comprising:
    receiving a request for a service for a subscriber at an access gateway;
    receiving, at the access gateway, from a first source, a default subscriber policy and a default service policy for the subscriber;
    receiving, at the access gateway, from a second source, a specific subscriber policy and a specific service policy for the subscriber and the service being requested, wherein the first source is physically separate from the second source, and wherein the specific subscriber policy and the specific service policy are different than the default subscriber policy and the default service policy;
    identifying information within a bearer service request associated with a particular subscriber;
    determining a specific service policy and charging rules function (PCRF) server to be used for a particular transaction involving the particular subscriber;
    providing correlation and discrepancy resolution between the default subscriber policy and the specific subscriber policy and the default service policy and the specific service policy for the service;
    receiving the service being requested at the access gateway; and
    communicating the service being requested from the access gateway to the subscriber in response to the request.

10. The logic of claim 9, wherein the information within the bearer service request includes a selected one of a group of pieces of information, the group consisting of:
    a) a destination address;
    b) a 5-tuple; and
    c) a uniform resource locator (URL) provided in a hypertext transfer protocol (HTTP) header.

11. The logic of claim 9, wherein the access gateway includes a local PCRF functionality to be provided to a particular subscriber.

12. The logic of claim 9, wherein the access gateway is configured to evaluate behavior associated with the subscriber in order to respond to subscriber policy requests for particular network services.

13. The logic of claim 9, wherein the access gateway is configured to determine a subset of subscribers accessing similar services, and to group the subset of subscribers into a subscriber group for which a specific group policy is applied to.

14. The logic of claim 13, wherein the subscriber group is formed based on usage trends and current services associated with the subset of subscribers.

15. The logic of claim 9, the operations further comprising:
receiving a second subscriber policy and a second service policy for the requested service if the specific subscriber policy and the specific service policy for the service being requested do not conform to the default subscriber policy and the default service policy.

16. The logic of claim 9, wherein policies for the service are defined in serial.

17. A network element, comprising:
a memory element; and
a processor operable to execute instructions such that the network element is configured for:
receiving a request for a service for a subscriber;
receiving, at the access gateway, from a first source, a default subscriber policy and a default service policy for the subscriber;
receiving, at the access gateway, from a second source, a specific subscriber policy and a specific service policy for the subscriber and the service being requested, wherein the first source is physically separate from the second source, wherein the specific subscriber policy and the specific service policy are different than the default subscriber policy and the default service policy;
identifying information within a bearer service request associated with a particular subscriber;
determining a specific service policy and charging rules function (PCRF) server to be used for a particular transaction involving the particular subscriber;
providing correlation and discrepancy resolution between the default subscriber policy and the specific subscriber policy and the default service policy and the specific service policy for the service;
receiving the service being requested; and
communicating the service being requested to the subscriber in response to the request.

18. The network element of claim 17, wherein the network element includes a local PCRF functionality to be provided to a particular subscriber.

19. The network element of claim 17, wherein the network element is configured to determine a subset of subscribers accessing similar services, and to group the subset of subscribers into a subscriber group for which a specific group policy is applied to, and wherein the subscriber group is formed based on usage trends and current services associated with the subset of subscribers.

20. The network element of claim 17, wherein policies for the service are defined in serial.

\* \* \* \* \*